(12) United States Patent
Samadpour

(10) Patent No.: US 8,603,735 B2
(45) Date of Patent: *Dec. 10, 2013

(54) ADVANCED PATHOGEN TESTING AND CARCASS-CERTIFICATION METHODS FOR SLAUGHTER OPERATIONS

(75) Inventor: Mansour Samadpour, Seattle, WA (US)

(73) Assignee: Institute for Environmental Health, Inc., Lake Forest Park, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/046,032

(22) Filed: Mar. 11, 2011

(65) Prior Publication Data

US 2012/0040845 A1 Feb. 16, 2012

Related U.S. Application Data

(63) Continuation of application No. 10/839,325, filed on May 5, 2004, now Pat. No. 7,919,232.

(60) Provisional application No. 60/467,301, filed on May 5, 2003.

(51) Int. Cl.
*C12Q 1/00* (2006.01)
*C12Q 1/22* (2006.01)
*C12Q 1/04* (2006.01)

(52) U.S. Cl.
USPC ........ 435/4; 435/5; 435/6.1; 435/7.1; 435/29; 435/34

(58) Field of Classification Search
None
See application file for complete search history.

(56) References Cited

U.S. PATENT DOCUMENTS

2002/0004091 A1 1/2002 Schaefer et al.

FOREIGN PATENT DOCUMENTS

EP 295349 A2 12/1988

OTHER PUBLICATIONS

Elder, R.O. et al., "Correlation of enterohemorrhagic *Escherichia coli* O157 prevalence in feces, hides and carcasses of beef cattle during processing," *Proc. Natl. Acad. Sci.*, vol. 97, No. 7, pp. 2999-3003, Mar. 28, 2000.

Gill et al., "Microbiological sampling of carcasses by excision or swabbing," *Journal of Food Protection*, vol. 63, No. 2, pp. 167-173, Feb. 2000.

Godden et al., "The effect of sampling time and sample handling on the detection of *Staphylococcus aureus* in milk from quarters with subclinical mastitis," *Can. Vet. J.*, vol. 43, Jan. 2002, pp. 38-42.

International Search Report issued Jan. 17, 2006 in International Application No. PCT/US2004/1014130.

Kilsby, D.C., "Sampling Schemes and Limits," *Meat Microbiology*, Chapter 10, pp. 387-421, M.H. Brown (editor), Applied Science Publishers, 1982.

Korsak et al., "An efficient sampling technique used to detect four foodborne pathogens on pork and beef carcasses in nine Belgian abattoirs," *Journal of Food Protections*, vol. 61, No. 5, pp. 535-541, 1998.

Patil, G.P., "Editorial: Composite sampling," *Environmental and Ecological Statistics*, vol. 2, pp. 169-179, 1995.

Siragusa et al., "Monitoring the microbial contamination of beef carcass tissue with a rapid chromogenic Limulus amoebocyte lysate endpoint assay," *Letters in Applied Microbiology*, vol. 31, pp. 178-183, 2000.

Tsai et al., "Determination of the sensitivity of a rapid *Escherichia coli* O157:H7 assay for testing 375-gram composite samples," *Appl. Environ. Microbiol.*, Sep. 2000, vol. 66, No. 9, pp. 4149-4151.

USDA Guidelines for *Escherichia coli* Testing for Process Control Verification in Cattle and Swine Slaughter Establishments (1996) (22 pages) (http://www.fsis.usda.gov/regulations/Compliance_Guides_Inde/index.asp).

*Primary Examiner* — Samuel Woolwine
(74) *Attorney, Agent, or Firm* — Barry L. Davison; Davis Wright Tremaine LLP

(57) ABSTRACT

The invention provides methods for certification of carcasses, and for detecting a contaminated carcass and preventing its movement into or across a production area. The inventive methods comprise obtaining, early in the production process (pre-fabrication), a test sample from at least one test location of at least one split-portion of each carcass, wherein the test samples are obtained prior to or during chilling of the respective split portions, before entry thereof in the production chain. Composite test samples are assayed for pathogens or microbes, whereby certification is afforded, or whereby entry of the chilled split-carcass-Lot into the production area is precluded if the corresponding composite-Lot test sample is contaminated. Methods for remedial reconditioning of contaminated split-carcasses are provided, wherein essentially 100% of the carcasses are targeted to the production line. The inventive methods provide substantial public health benefit, and are efficient and economical to implement.

34 Claims, 4 Drawing Sheets

ADVANCED PATHOGEN TESTING AND CARCASS-CERTIFICATION METHODS FOR SLAUGHTER OPERATIONS

CROSS-REFERENCE TO RELATED APPLICATIONS

This application is a continuation of U.S. patent application Ser. No. 10/839,325 filed 5 May 2004 (U.S. Pat. No. 7,919,232) and entitled "ADVANCED PATHOGEN-FREE TRIM TESTING AND CARCASS-CERTIFICATION PROGRAM FOR BEEF SLAUGHTER OPERATIONS," which claims the benefit of priority to U.S. Provisional Application Ser. No. 60/467,301, filed 5 May 2003 of same title, which are incorporated by reference herein in their entirety.

FIELD OF THE INVENTION

The present invention, in various aspects, relates generally to improving the efficiency of producing meat products, and the safety and quality of meat products, including but not limited to beef, pork, sheep, bison, deer, elk, poultry (e.g., chicken and turkey) and fish. More specifically, embodiments of the present invention related to novel methods for detecting, monitoring and eliminating microbes or pathogens in the slaughter and meat-packing industry.

BACKGROUND

Many meat producers, in response to regulatory directives and Guidelines, and customer/consumer demands, have adopted a sampling plan or methodology for the testing of 'trim,' precuts, and/or of ground raw materials and final products for: pathogens, including *E. coli* O157:H7, *Salmonella, Listeria, Staphylococcus*, etc.; spoilage organisms, including clostridial and *Pseudomonas* species, etc.; and indicator organisms, including generic *E. coli*, fecal coliforms, total coliforms, etc., and indicator substances including glial fibrillary acidic protein (GFAP) associated with central nervous system tissue. The end result of current testing using the presently available plans provides results that are obtained too late to afford improvement of the quality of the product batch from which the samples were taken. Such prior art plans or methodologies are good-faith attempts to comply with the guidelines and consumer demands, but the these plans fall short of achieving a statistically robust 'lot' acceptance criteria that would represent a significant improvement in the microbiological quality of foods.

Generally, carcass processing in the slaughter and meat packaging industry proceeds by killing the animals, de-hiding, splitting the carcasses into respective half-carcasses, chilling of half-carcasses, and subsequent reduction and fabrication (e.g., processing of the carcasses by cutting to harvest various primal and sub-primals, which results in production of trims). While various primal and sub-primal cuts of meat are packaged and shipped, meat trimmings and other appropriate cuts which are to be used in ground beef production are placed into respective packing units referred to as 'combos' or 'combo-bins,' each containing about 2,000 lbs of trimmings, corresponding to a plurality of different carcasses. A prior art 'packing-Lot' is composed of five 'combo-bins.' The packing-Lots are the final aggregates of product to be shipped to customers or used in-house for further conversion to ground beef.

Prior art pathogen-testing plans are actually either trim-testing plans, final product testing plans, or both, involving random and incomplete sampling at the 'packing-Lot' level; that is, testing of trim samples near the end of the production chain (as they enter the bins or after binning, or testing of the ground products by taking samples at given time intervals. A typical trim-testing plan involves analysis of 'five-combo-lot' units, and comprises analysis of a single composite-Lot sample of about 375 g, prepared by combining five combo-bin samples (about 75 g each), in each case corresponding to one to five randomly-selected pieces from each combo-bin, such that, on average 5-25 pieces representing the five combo-bins are in the composite sample. Given that a combo-bin is comprised of pieces of a plurality of carcasses, the test results under these prior art systems reflect random and incomplete sampling; that is, only a small fraction of the carcasses are represented in the test results, particularly where, as is true of many such plans, only a sub-fraction of the composite-Lot sample is used for the pathogen-testing assay (e.g., when large pieces of trim are collected). For example, for ground beef production, final product testing comprises taking ground beef samples at given time intervals (e.g., every 10-30 minutes) and compositing a number of samples into one composite sample.

Generally, one of several methods of analysis has been used for pathogen detection after sampling at the packing-Lot level: (1) Immunochemical based detection (e.g., ELISA based immunoassays) following enrichment (e.g., for *E. coli* O157:H7); (2) Nucleic acid-based (e.g., DNA-based, such as PCR-analysis) detection methods following enrichment (e.g., for *E. coli* O157:H7), wherein an appropriate medium is inoculated with a composite-Lot sample; and (3) target organisms can be detected by enrichment, followed by immunomagnetic separation followed by plating, immunochemical or DNA based detection. Typically, the levels of sensitivity of most of these methods are set at about 1 colony forming unit (cfu)/25 g of sample.

Typically, to allow time for trim testing results to be obtained, such sampling plans require additional (in addition to initial chilling of the split-carcasses, and the time taken during the processing of the carcasses (fabrication)) 'holding' of the trim prior to use. Such holding of the trim will typically add 12 to 24 hrs of extra refrigeration storage time/capacity, and uses up about a day of the product shelf-life.

Additionally, a particularly problematic aspect of prior art plans is that they are reactive; that is, they neither allow for meaningful preemptive (do not prevent cross-contamination during trimming) or remedial (not practical to remediate at the trim level) actions, nor do they provide for sufficient confidence in product safety.

Therefore, despite good-faith efforts, there is a lack of adequate public health protection under prior art sampling plans, because these plans do not insure against acceptance of defective lots. The prior art sampling plans are reactive, and by the time a 'positive' lot is identified, the respective contamination has moved across the fabrication and packaging areas increasing the likelihood of cross-contamination of multiple batches of products. Additionally, by the time positive lots have been identified, the products have moved through fabrication and there can be no remedial action, because it is impractical to sterilize at the sub-primal trim level. Rather the options are destruction (e.g., rendering) or cooking of the respective product lots by a commercial cooker.

However, such procedures will not ensure the safety of other lots of products that have either been contaminated by the positive-testing lot, or that are in fact positive, but have nonetheless tested negative by virtue of the absence of a statistically robust sampling plan (i.e., by virtue of using random and incomplete sampling of the trim-testing regime).

Moreover, prior art plans are substantially disruptive to commerce, because they require increased cold storage time and capacity, disrupt shipping (e.g., recalls), and increase the hold-time before-processing—all of which add significant costs, and reduce product shelf-life. Furthermore, any Lot identified as contaminated will lose all or a significant portion of its value.

Therefore, there is a pronounced need in the art, and particularly in the slaughter and meat-packing industry, for monitoring and verification methods that are more statistically robust, and thus improve and adequately insure the safety of processed food products.

There is a pronounced need in the art for improved monitoring, verification, and remediation methods that can be implemented without major disruption to the production process and that are cost-effective.

There is a pronounced need in the art for improved monitoring, verification, and remediation methods that preclude cross-contamination along the production line (during fabrication).

There is a pronounced need in the art for improved monitoring, verification, and remediation methods that can be used to identify defective lots of products at early stages (carcass stage as opposed to trim or final products) so that they can be sanitized/reconditioned retested and released.

SUMMARY OF THE INVENTION

Preferred aspects of the present invention provide novel and cost-effective monitoring, verification and remediation methods for the slaughter and meat-packing industry (e.g., beef, pork, sheep, deer, bison, elk, poultry and fish) that insure the safety of final products. The inventive methods are based on early detection of contaminated carcasses, and their removal from the production line. Preferred sites (carcass locations) of sampling are disclosed. In particularly preferred embodiments, identified contaminated carcasses are returned to production after remedial reconditioning and clearance sampling (re-testing).

Methods of the invention minimize economic loss, because they are substantially less disruptive to production and distribution processes than prior art methods. Moreover, and significantly, a much higher degree of confidence in the safety of products is afforded relative to prior art methods, because the inventive methods insure that the final product is free of pathogens (e.g., *E. coli* O157:H7) with a high level of confidence (85-99%).

In a preferred aspect, the invention provides a method for detecting a contaminated carcass and preventing its movement into or across a production area, comprising: splitting carcasses of a carcass-Lot; obtaining a test sample from at least one test location of at least one split portion of each carcass; combining the test samples to provide a composite-Lot test sample; and determining, by assaying the composite-Lot test sample or a portion thereof with an assay suitable to detect microbial or pathogenic contamination, whether or not the composite-Lot test sample is contaminated, whereby entry of the chilled split-carcass-Lot into the production area is precluded if the corresponding composite-Lot test sample is contaminated. Preferably, the test samples are obtained immediately prior to chilling of the respective split portions. Preferably, the test location for obtaining the test sample is selected in a random or rotational order from the group consisting of but not limited to rump, brisket, back and flank, and combinations thereof. In particular aspects, obtaining a test sample comprises obtaining a plurality of test samples from one or more test locations of at least one split portion of each carcass. Preferably, the carcass-Lot size is about 50 carcasses, and one test sample is obtained from each respective split portion. Alternatively, the carcass-Lot size is about 100 carcasses, and only one test sample per carcass is obtained from one of the respective split portions. Preferably, the detection assay is selected from the assay group consisting of immunoassays, nucleic acid amplification-based (e.g., PCR-based assays), nucleic acid hybridization-based assays, bio-sensor assays, immunostaining-microscopy based assays, nucleic acid-array-based (e.g., DNA chip-based) assays, bacteriophage detection based assays, classical microbiology based assays, and chemical/biochemical assays based on the detection of compounds associated with particular groups of target organisms, and combinations thereof. Preferably, the test sample is a surface sample (e.g., a blotted, swabbed or sponged sample, or an excised surface tissue section) corresponding to, or having a surface area of about 16 square inches (e.g., about 4×4 inches). Alternatively, a preferred test sample is comprised of multiple surface samples corresponding to or having a collective surface area of about 16 square inches. Preferably, the detected microbe is a pathogen such as *Escherichia coli* O157:H7 (*E. coli* O157:H7), *Listeria*, *Salmonella*, EHEC, *Campylobacter*, *Staphylococcus*, pathogenic Clostridial species, and other frank, or opportunistic pathogens. The methods also encompass the detection of spoilage organisms such as clostridial and *pseudomonas* species, and indicator organisms including generic *E. coli*, fecal coliforms, total coliforms, etc. Preferably, the carcasses are of cattle, sheep, pigs, deer, bison, poultry or fish.

In further particularly preferred embodiments, the above-described methods further comprise, in an instance of composite-Lot sample contamination: sanitizing/pasteurizing the corresponding contaminated split-carcass-Lot and providing at least one remedial-Lot; obtaining remedial test samples; combining, for each remedial-Lot, the remedial test samples to provide a composite-remedial-Lot test sample; and determining, for each remedial-Lot, whether or not the composite-remedial-Lot test sample is contaminated, whereby entry of the respective chilled remedial split-carcass-Lot into the production area is allowed if the corresponding composite-remedial-Lot test sample is not contaminated. Preferably, sanitizing/pasteurizing comprises pasteurizing/sanitizing the corresponding contaminated split-carcass-Lot, and subdividing it to provide four equal or substantially equal respective remedial-Lots. Alternatively, the contaminated split-carcass-Lot is subdivided prior to remedial sanitizing/pasteurizing (e.g., by hot-water or steam pasteurization, or lactic-acid spray, etc.).

DETAILED DESCRIPTION OF THE INVENTION

Definitions

Figure 1A:
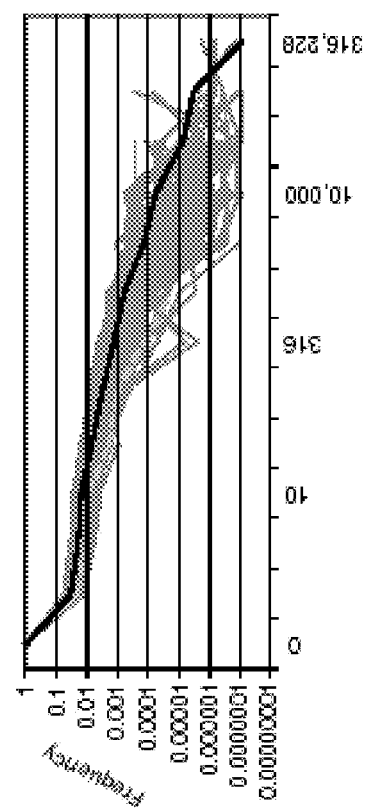
FIGS. 1A and 1B illustrate the estimated frequency of various levels of *E. coli* O157:H7 in prior art Combo-bins based on 100 simulations of a USDA risk assessment model (see EXAMPLE I, herein below). The data is reproduced from a USDA draft risk assessment (FSIS, by *Escherichia coli* O157:H7 Risk Assessment Team, 2001; "Draft Risk Assessment of the Public Health Impact of *Escherichia coli* O157:H7 in Ground Beef").
Figure 1A:
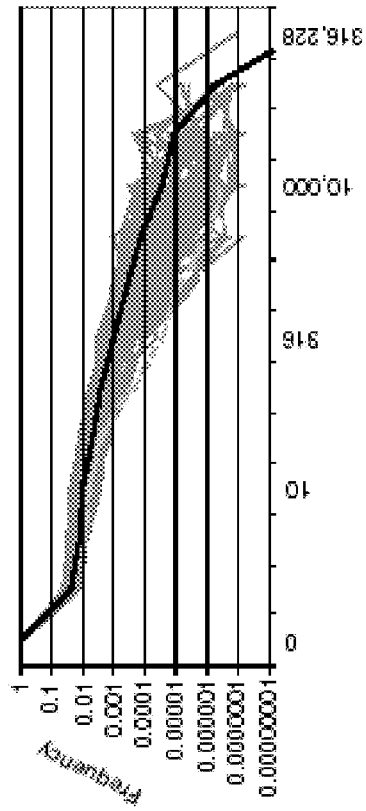

"Carcass" refers to the body of the livestock after harvest, de-hiding (or, as the case may be, de-feathering, de-skinning, de-scaling), and evisceration. Preferred embodiments relate to beef carcasses, but the present invention encompasses carcasses of pigs, sheep, deer, bison, elk, poultry (e.g., turkey, chicken) and other animals (e.g., fish) that are killed and processed into products that may contain pathogens and/or other microbes of interest.

Carcass "splitting" refers to splitting of the carcass into portions, including into two half-carcasses or half-carcass portions. In preferred embodiments, splitting refers to splitting into two half-carcass portions.

"Fabrication" refers to the process of cutting-up half-carcass into marketable cuts (e.g., primals, sub-primals, trim).

"Trim" refers to small pieces of meat and fat which are excised during the fabrication process in order to produce primal and subprimal pieces and marketable cuts.

"Trim testing" refers to the process of testing trim, or raw materials which are to be used for ground meat production for microbial/pathogen content.

A "combo" or "combo-bin" refers to the trim packaging unit. Alternatively raw materials to be tested can be packaged into boxes, bags or other appropriate containers, which can be placed, for example, on pallets.

A "Lot-unit" or "five-combo-lot unit" refers to a composite unit, comprised of five combos (combo-bins). In prior art sampling plans, the Lot-unit represents raw the material (composite trim) upon which sampling, testing and acceptance or rejection is based.

A prior art "Bin-sample" refers to a sample (typically about 75 g), comprised of 1-12 randomly-selected pieces from a single combo-bin. Typically, in prior art sampling plans, the standard manner of collection is to randomly pick five pieces as a comb-bin is being filled.

A prior art "Lot-unit sample" refers to a 375 g composite sample, comprised seventy-five (75) gram samples from each combo-bin of the Lot-unit. In a variation of the typical prior art protocol, the random piece samples from each combo-bin (the Bin-samples) are subjected to grinding, then composite Lot-samples are made from the respective ground Bin-samples.

"Sampling" or "obtaining samples" refers to obtaining, in a form suitable for pathogen/microbe testing purposes, a sample of the pathogens and/or other microbes of interest present on the surface of one or more test locations of the carcass or sub-carcass portion. Any sampling method is encompassed, provided that it is suitable to acquire (or include), at least to some extent, the surface pathogens/microbes. Preferably, the sampling method is by excision, or by blotting, swabbing, sponging, and the like (see under "Samples and Sample Locations, herein below)

Overview

Departure from Prior Art Reactive Presumptions. Prior art methods of sampling and testing for contamination in the slaughter and meat packing industry are based on the art-recognized premise that the sampling point should be at or near the final processing step so that contamination introduced along the production chain is, at least in principal, detected and hopefully eliminated, or recalled, before consumption of the respective products.

Therefore, prior art sampling methods presume contamination from various points along the production line and are designed as reactive, late-detection damage-control plans. Unfortunately, the plans are fundamentally limited and fundamentally flawed by the fact that late in production, carcasses have been reduced by the fabrication process into various primal and sub-primal, pieces, and into a huge number of trim pieces so that, for practical reasons, only a small fraction of the pieces are sampled and tested. Moreover, at this point in the production process, it is too late for any remedial (reconditioning) action. Furthermore, the trim pieces are not attributable to any particular carcass of sub-carcass portion. Therefore, because only trim pieces are tested (not primal or sub-primal portions), even if a composite-trim sample tests positive, there is no way to correlate the result to any particular primal or subprimal portions. Therefore, there is no way to remove primal and subprimal portions that might be contaminated from the production line and the distribution chain. Therefore, the consumer population is vulnerable, because prior art testing is at the composite-trim stage in the fabrication process.

Additionally, some carcasses (e.g., retired dairy animals) have primal and sub-primal portions with undesirable properties, and some production/fabrication plans include 'non-intact use' procedures with respect to primal and sub-primal portions. For example, a typical non-intact use procedure is injection needling and tenderization, where primal and sub-primal portions are injected with tenderizing solutions to modify the properties of the meat. Such invasive procedures are currently being closely scrutinized as they are regarded (like grinding) as mechanisms to spread any surface contamination into the interior of the primal and sub-primal portions. Therefore, the prior art trim-testing sampling plans are further, and particularly inadequate in instances where 'non-intact use' procedures are used in the industry.

Therefore, despite good intentions, the prior art testing plans are not statistically robust, and most of the product reaching the consumer has in fact not been tested at all. The testing plans are disruptive of the production process, and do not allow for remedial action once a positive lot is identified. Furthermore the plans allow for the movement of microbial contamination from the contaminated carcasses and the harvest floor to the fabrication floor and grinding rooms. The cross-contamination can result in the spread of low-level contamination that is hard to detect and can result in human health effects in the consumers. Unfortunately, under such reactive plans, the real test entity is the consumer.

Significantly, however, according to the present invention, the major source of contamination within and throughout the production line occurs early in the process, and is actually traceable to the surfaces of the carcasses. According to the present invention, most or essentially all of the pathogenic/microbial contamination that enters the production stream does so either (i) early in the process where it is already present on carcasses within carcass-Lots prior to chilling and entry thereof into the subsequent production line, or (ii) as a result of contamination traceable to harvest floor sources (i.e., cross-contamination along the production line, but from carcasses, sub-carcasses).

Accordingly, preferred aspects of the present invention depart from the reactive presumptions of the prior art, and provide preemptive, early sampling and testing methods that have sufficient statistical robustness so that contaminated carcasses are identified and removed before entry into the production line, thus precluding or substantially reducing subsequent contamination (e.g., cross-contamination) during carcass fabrication along the production line.

Major Public Health Benefit. The inventive methods disclosed herein allow, for the first time, production of products from certified carcasses that have been subjected to 100% testing for one or more pathogens/microbes, and thus offer substantial public health benefits to consumers and the industry. The methods achieve a very high level of confidence in the safety of the products (e.g., beef and ground beef), and are both economical and practical to implement. Preferred aspects of the inventive sampling, detection and remediation methods will particularly benefit beef consumers, and producers by the virtue of the fact that they allow for early detection and elimination of *E. coli* O157:H7. The invention also encompasses applications relating, inter alia, to pig, sheep, deer, elk, bison, poultry (e.g., chicken, turkey) and fish products.

The safety levels of the inventive processes are primarily based on the efficacy of initial detection and the low likelihood of cross-contamination at downstream processing steps. Safety is further assured within the processing facility by implementation of adequate environmental controls (cleanroom conditions), and a separation of the 'kill-floor' from the downstream fabrication/processing areas. Preferably, therefore, the inventive methods are adopted as a monitoring plan as a part of a processing plant's HACCP plan. Preferably, a verification plan based on ICMSF Case 14 or 15 trim and ground beef testing protocols is used on a monthly basis.

The inventive lot acceptance sampling methods afford up to a thirty-fold improvement in reducing the probability of accepting a defective lot, relative to a typical prior art lot acceptance sampling plan (2.5% probability of accepting a defective lot, vs. 86.7%, respectively). This improvement is based primarily on the use of a larger number of samples collected (i.e., use of a lager value for n, the number of samples collected; see herein below under EXAMPLE I) (the per carcass extent of sampling is much higher than that of prior art trim testing), and in part on selection of optimal test locations; that is, on the likelihood that the incident rate of *E. coli* O157:H7 or other pertinent microbes on surface samples taken early from carcasses at preferred locations will be higher (and therefore easier to detect) than the incidence on later trim portions, where the contaminated skin has been "diluted" with deep muscle tissue during fabrication (e.g., cutting, grinding, etc.).

Preferred Embodiments. According to preferred aspects of the present invention, carcasses (e.g., beef, sheep, pigs, deer, elk, bison, poultry, and fish) typically spend up to 24 hours in chilled storage prior to being cut up into, or generating, trim (prior to fabrication), and this is sufficient time to run an adequate detection assay (e.g., presence/absence assays) for microbes or other pathogens. Furthermore, carcass-Lots are identifiable, and carcasses are typically tagged with unique identifiers, and thus, according to the present invention, where a timely and statistically-significant positive result (contaminated carcass) is obtained, the respective contaminated carcass-Lot is precluded from entering the fabrication/production chain. Therefore, cross-contamination is reduced or eliminated, where carcasses carrying contamination are removed from the process stream prior to being cut into, or generating, trim (e.g., the possibility of transferring any contamination to equipment such as knives and conveyor belts is reduced or eliminated).

In a preferred aspect, the inventive method comprises splitting of a carcass-Lot to produce a split-carcass-Lot (Lot of split-portions), and obtaining at least one surface test sample from at least one preferred sample location of one or both split-portions, immediately prior to chilling of the split-portions. In a particularly preferred embodiment, at least three distinct surface samples are taken from each half-carcass. The test samples are combined to form a composite-Lot test sample, and the composite-Lot test sample, or a portion thereof is used for determining whether contamination is present by using an assay suitable to detect the microbe or pathogen of interest. Preferably, a carcass-Lot is a group of 50-100 carcasses. Preferably, at least one half of each carcass is surface-sampled (e.g., by excision, blotting, swabbing or sponging). Preferably, testing is of composite-Lot samples comprising at least 25, at least 50, at least 100, at least 150, at least 200, or at least 300 surface samples (e.g., blotting, swabbing or sponging, or thinly excised sample slices). Preferably, three to four carcass sampling stations (locations) are established. Preferably, the sampling stations correspond to carcass sites that are most likely, according to the present invention, to be contaminated, based on factors regarding the locations and incident rates of a given pathogen such as *E. coli* O157:H7. Preferably, the test locations are selected in a random or repeated (rotational) order from the group consisting of rump, brisket, back and flank, and combinations thereof. Preferably, from rump, brisket and/or flank.

Preferred Remedial Embodiments. The inventive methods not only result in effective identification of contaminated lots, and hence prevent the spread of contamination throughout the fabrication and grinding operations, but also afford enough time for detailed remedial sanitation/reconditioning, and clearance sampling and testing of such remedial-Lots or remedial-sub-Lots. In preferred aspects, any contaminated carcass-Lot (e.g., containing about 50 or about 100 carcasses) is divided into fractional sub-lots that are subjected to detailed reconditioning (e.g., hot water pasteurization and/or lactic acid spray), followed by clearance sampling and testing, whereby cleared remedial-Lots are certified for entry into the production stream. Preferably, the remedial-Lots are smaller sub-lots of about 25 carcasses, so that where only one sterilized remedial-Lot is still positive, the others are certifiable for entry into the production chain. In particularly preferred embodiments, essentially 100% of the product stream (all split-carcass-Lots and remedial split-carcass Lots) is directed towards the desired endpoint. Significantly, the costs associated with such remedial embodiments are substantially less than those of prior art methods that involve recalling trucks (and even retail products), and destroying (e.g., rendering) or diverting a portion of the product to cooked products, as is currently done.

Certification Embodiments. Alternate preferred embodiments provide methods for the certification of sampled and tested carcasses, primal cuts, sub-primal cuts, and variety meats. According to the present invention, when a carcass has tested negative, for example, for *E. coli* O157:H7 by surface sampling, it can safely be assumed that primal and sub-primal cuts, including 'non-intact-use' portions (e.g., injection needling tenderization), are also negative.

Specific Preferred Embodiments

Preferred aspects provide a method for detecting a contaminated carcass and preventing its movement into or across a production area, comprising: splitting carcasses of a carcass-Lot to provide a split-carcass-Lot, wherein each split portion is identifiable with, or otherwise attributable to a particular carcass- or split-carcass-Lot, or (for particular embodiments) a particular carcass of the Lot; obtaining a test sample (surface sample) from at least one test location of at least one split portion of each carcass, wherein the test samples are obtained prior to chilling of the respective split portions, to produce a sampled and chilled split-carcass Lot;

combining the test samples to provide a composite-Lot test sample; and determining, by assaying the composite-Lot test sample or a portion thereof with an assay suitable to detect microbial or pathogenic contamination, whether or not the composite-Lot test sample is contaminated, whereby entry of the chilled split-carcass-Lot into the production area is precluded if the corresponding composite-Lot test sample is contaminated.

While the inventive methods are application to essentially any slaughter processing operation, preferably, the carcass is selected from the group consisting of cattle, sheep, pigs and deer, elk, bison, poultry and fish.

Preferably, the test location for obtaining the test sample is selected in a random or rotational order from the group consisting of rump, brisket, back and flank, and combinations thereof. Alternatively, the location could be any other surface part of the carcass or sub-carcass that is determined to be a 'hot-spot' for pathogenic/microbial contamination. Most preferably, the test location is selected, during sampling, in a repeated (rotational) order from the aforementioned group. In particular aspects, obtaining the test sample comprises obtaining a plurality of test samples (surface samples) from at least one test location (preferably three distinct locations) of at least one split portion of each carcass. Preferably, the test sample is a surface sample (e.g., swabbed, blotted, sponged, or excised surface tissue section) corresponding to, or having a surface area of at least 4, at least 6, at least 8, at least 10, at least 12, or at least 16 square inches. A test sample may comprise a plurality of such samples. More preferably, the test sample is a surface sample, or an excised surface tissue section corresponding to, or having a surface area of about 16 square inches. Even more preferably, the test sample is a surface sample comprising three surface samples, each from a distinct sample location, and each having a surface area of about 16 square inches.

The carcass Lot size may vary according to the particular processing setting and equipment. Preferably, however, the carcass-Lot size is about 50 carcasses, and obtaining test samples comprises obtaining at least one test sample from each respective split-portion, and the test location is rotationally selected from the group consisting of sites most likely to harbor microbial pathogens (e.g., rump, brisket, back and flank). Preferably, the test sample comprises three surface samples, each from a distinct sample location. Alternatively, the carcass Lot size is about 100 carcasses, and obtaining comprises obtaining at least one test sample per carcass from one of the respective split portions, and the test location is rotationally selected from the group consisting of sites most likely to harbor microbial pathogens (e.g., rump, brisket, back and flank, and combinations thereof). Preferably, the test sample comprises three surface samples, each from a distinct sample location. Effective variations, based on the teachings disclosed herein, of Lot sizes, sampling protocols, sampling sites and sampling methods will be appreciated and determinable without undue experimentation by those of ordinary skill in the relevant art, and are therefore encompassed within the scope of the present invention.

Preferably, the detection assay is selected from the assay group consisting of immunoassays, nucleic acid amplification-based (e.g., PCR-based assays), nucleic acid hybridization-based assays, bio-sensor assays, immunostaining-microscopy based assays, nucleic acid-array-based (e.g., DNA chip-based) assays, bacteriophage detection based assays, classical microbiology based assays, and chemical/biochemical assays based on the detection of compounds associated with particular groups of target organisms, and combinations thereof.

Preferably, the detected microbe is a pathogen such as *Escherichia coli* O157:H7 (*E. coli* O157:H7), *Listeria*, *Salmonella*, EHEC, *Campylobacter*, *Staphylococcus*, pathogenic Clostridial species, and other frank, or opportunistic pathogens. The methods also encompass the detection of spoilage organisms such as clostridial and *pseudomonas* species, and indicator organisms including generic *E. coli*, fecal coliforms, total coliforms, etc. More preferably, the pathogen is *Escherichia coli* O157:H7 (*E. coli* O157:H7).

Preferably, the carcasses are of cattle, sheep, pigs, deer, elk, bison, poultry or fish.

In particularly preferred embodiments, the invention provides for the methods described above, further comprising, in an instance of composite Lot sample contamination: reconditioning (e.g., pasteurizing/sanitizing) the corresponding contaminated split-carcass Lot to provide at least one respective remedial Lot; obtaining, for each remedial Lot, a remedial test sample from at least one location of at least one split portion of each remedial carcass, wherein the remedial test samples are obtained prior to chilling of the respective split portions, to produce a sampled and chilled remedial split carcass Lot; combining, for each remedial Lot, the remedial test samples to provide a composite remedial Lot test sample; and determining, for each remedial lot, by assaying the respective composite remedial Lot test sample or a portion thereof with an assay suitable to detect microbial or pathogenic contamination, whether or not the composite remedial Lot test sample is contaminated, whereby entry of the respective chilled remedial split carcass Lot into the production area is allowed if the corresponding composite remedial Lot test sample is not contaminated.

Preferably, reconditioning comprises pasteurizing/sanitizing the corresponding contaminated split-carcass Lot, and subdividing it to provide a plurality of fractional respective remedial Lots, wherein obtaining comprises obtaining at least one remedial test sample from each respective remedial split portion, and wherein the remedial test location is randomly or rotationally selected from the group consisting of sites most likely to harbor microbial pathogens (e.g., rump, brisket, back and flank, and combinations thereof). Preferably, from rump, brisket, flank and combinations thereof.

Alternatively, and preferably: reconditioning comprises pasteurizing/sanitizing the corresponding contaminated split-carcass Lot, and subdividing it to provide a plurality of fractional respective remedial-Lots; obtaining comprises obtaining at least one remedial test sample per carcass from one of the respective remedial split portions, and the remedial test location is rotationally selected from the group consisting of sites most likely to harbor microbial pathogens (e.g., rump, brisket, back and flank, and combinations thereof). Preferably, the test location is selected from the group consisting of from rump, brisket, flank and combinations thereof.

In particular aspects, obtaining a remedial test sample comprises obtaining one or more surface samples from at least one test location of at least one remedial split portion of each carcass. Preferably, the remedial test sample is a surface sample (e.g., swabbed, blotted, sponged, or an excised surface tissue section) corresponding to, or having a surface area of at least 4, at least 6, at least 8, at least 10, at least 12, or at least 16 square inches. More preferably, the remedial test sample is a surface sample corresponding to, or having a dimension of about 16 square inches. Preferably, the remedial test sample comprises three such surface samples, each from a distinct location of the split-portion.

Preferably, the detection assay is selected from the assay group consisting of immunoassays, nucleic acid amplification-based (e.g., PCR-based assays), nucleic acid hybridization-based assays, bio-sensor assays, immunostaining-microscopy based assays, nucleic acid-array-based (e.g., DNA chip-based) assays, bacteriophage detection based assays, classical microbiology based assays, and chemical/biochemical assays based on the detection of compounds associated with particular groups of target organisms, and combinations thereof.

In particularly preferred embodiments, the method comprises reconditioning (e.g., pasteurizing/sanitizing) the corresponding contaminated split-carcass Lot, and subdividing it to provide at least four equal or substantially equal respective remedial-Lots.

Type of Pathogens/Microbes to be Detected

In preferred embodiments, the present inventive methods encompass the detection of *Escherichia coli* O157:H7 (*E. coli* O157:H7), enterohemorrhagic *Escherichia coli* (EHEC), enterotoxigenic *Escherichia coli* (ETEC), enteroinvasive *Escherichia coli* (EIEC), enterpathogenic *Escherichia coli* (EPEC), *Salmonella, Listeria, Yersinis, Campylobacter,* Clostridial species, *Staphylococcus* spp. Additionally, other pathogens and pathogenic agents are encompasses within the present invention, including, but not limited to other frank and opportunistic bacterial, fungal, viral, parasitic pathogens; indicator organisms (total heterotrophes, generic *E. coli*, total and fecal coliforms, *enterococcus*, etc); and spoilage organisms (*Pseudomonas*, etc), and indicator molecules such as glial fibillary acid protein (GFAP), transmissable spongiform encephalopathy (TSE) agents (prions) (e.g., bovine spongiform encephalopathy (BSE) agents, scrapie (sheep), chronic wasting disease (e.g., deer, Elk).

Preferably, the detected microbe is: a pathogen including, but not limited to, *Escherichia coli* O157:H7 (*E. coli* O157:H7), *Listeria, Salmonella,* EHEC, *Campylobacter, Staphylococcus*, pathogenic Clostridial species, and other frank, or opportunistic pathogens; a spoilage organism including, but not limited to, clostridial and *pseudomonas* species; or an indicator organism including, but not limited to, generic *E. coli*, fecal coliforms, total coliforms, etc. More preferably, the pathogen is *Escherichia coli* O157:H7 (*E. coli* O157:H7).

Detection Assays

Preferably, the detection assay is selected from the assay group consisting of immunoassays, nucleic acid amplification-based (e.g., PCR-based assays), nucleic acid hybridization-based assays, bio-sensor assays, immunostaining-microscopy based assays, nucleic acid-array-based (e.g., DNA chip-based) assays, bacteriophage detection based assays, classical microbiology based assays, and chemical/biochemical assays based on the detection of compounds associated with particular groups of target organisms, and combinations thereof. Such assays are well known in the relevant art, and a few exemplary assays are as follows:

Reveal® test kits are available from Neogen Corporation, Lansing, Mich., and comprise an ELISA test that combines an immunoassay with chromatography in a lateral flow device (Reveal® test kits are available for *E. coli* O157:H7, *Salmonella, Listeria* spp. and *Listeria monocytogenes*);

VIP® test kits are available from BioControl, Bellevue, Wash., and comprise an ELISA test that is expressed as a lateral flow antibody-chromogen immunoprecipitate assay (VIP® test kits are available for EHEC, *Salmonella, Listeria* spp. and *Listeria monocytogenes*);

BAX® Qualicon test kits are available from DuPont, Wilmington, Del., wherein, using the BAX® system, samples are enriched and then lysed to release DNA, which is amplified using PCR techniques, and detected using a fluorescent signal (BAX® test kits are available for *E. coli* O157:H&, *Salmonella, Listeria* spp. and *Listeria monocytogenes*, and *enterobacter sakazakii*); and TSE (e.g., in cattle sheep and deer) can be tested by testing nervous system tissue (e.g., brain stem) for the respective agents (PrP) using, for example, ELISA assays, such as the Enfer TSE test, manufactured by Enfer Scientific, Newbridge Ireland, and distributed by Abbott Laboratories (Abbott Park, Ill.; see Abbott Application Note by Klass et al, 2002, "A test for transmissible spongiform encephalopathy," incorporated herein by reference).

Samples and Sample Locations

Sampling, as practiced herein, refers to obtaining, in a form suitable for pathogen/microbe testing purposes, a sample of the pathogens and/or other microbes of interest present on the surface of one or more test locations of the carcass or sub-carcass portion. Any sampling method is encompassed, provided that it is suitable to extract (or include), at least to some extent, the surface pathogens/microbes. Preferably, the sampling method is by excision, or by blotting, swabbing, sponging, and the like. Preferably, in order to produce results which allow systematic comparisons with additional monitoring of microbial interventions along process line, samples are collected at the rump, brisket, or flank and combinations thereof (see Elder et al., *PNAS* 97:2999-3003, 2000; Correlation of enterohemorrhagic *Escherichia coli* O157 prevalence in feces, hides, and carcasses of beef cattle during processing).

Preferably, obtaining a test sample, or remedial test sample, comprises obtaining one or more surface samples from at least one test location of at least one split-portion, or remedial-split-portion of each carcass. Preferably, the test sample, or remedial test sample, is a surface sample (e.g., swabbed, blotted, sponged, or an excised surface tissue section) corresponding to, or having a surface area of at least 4, at least 6, at least 8, at least 10, at least 12, or at least 16 square inches. More preferably, the test sample, or remedial test sample, is a surface sample corresponding to, or having a dimension of about 16 square inches. Preferably, the test sample, or remedial test sample, comprises three, or at least three, such surface samples, each from a distinct location of the split-portion. Preferably, the test location, or remedial test location, is randomly or rotationally selected from the group consisting of sites most likely to harbor microbial pathogens (e.g., rump, brisket, back and flank, and combinations thereof).

Remedial Cleaning Methods

In particularly preferred embodiments, a contaminated split-carcass-Lot is subjected to remedial reconditioning. Preferably, reconditioning comprises sanitizing/pasteurizing by hot-water or steam pasteurization, and/or by using an organic acid spray, (e.g., lactic-acid spray), etc.). Such methods are well known to those of ordinary skill in the relevant art.

The present invention will now be further illustrated by reference to the following EXAMPLES. However, it should be noted that these EXAMPLES, like the embodiments described above, are illustrative and are not to be construed as restricting the enabled scope of the invention in any way.

EXAMPLE I

Method of Estimating Robustness of Prior Art and Inventive Lot Acceptance Sampling Methods The USDA has a zero tolerance level for *E. coli* O157:H7. No numerical tolerance is expressed. The consequence of the USDA zero tolerance level for *E. coli* O157:H7 is that a lot (i.e., five-combo-lot; see definitions) is defective as soon as a positive result is obtained from a sample unit (i.e., Lot-sample; see definitions). In practice, no prior art sampling plan can guarantee the complete absence of a pathogen unless all material in the lot (five-combo-lot) is sampled, which is a practical impossibility. Furthermore, it is not yet commercially possible to produce product that is completely free of pathogens. Therefore, it is impossible to a priori design a sampling plan, according to art-recognized designs, that will meet USDA requirements.

Criteria. Nevertheless, it is possible to develop comparative data regarding the robustness of the prior art and inventive lot acceptance sampling methods/plans. Both of these plans are essentially two-class attribute plans, based on a test (assay) for the presence (positive result) or absence (negative result) of an organism or pathogen.

Under conventions set forth by the International Commission on Microbiological Specifications for Foods (ICMSF), for two-class attribute plans the probability of acceptance ($P_a$) for a lot is a function of three factors (see Microorganisms in Foods, 2002; Kluwer Academic/Plenum Publishers). The first is the actual incident rate (IR) of *E. coli* O157:H7 in the test lot at the sampling point. The second is "n", representing the number of sample units collected for the lot. The third is "c", representing the maximum allowable number of sample units yielding unsatisfactory results for the lot.

The approach taken by the present applicant was to compare the probability of acceptance ($P_a$) for a defective lot for the prior art and inventive lot acceptance sampling plans. The underlying premise is that the superior plan is the one that provides the greatest power of discrimination (i.e. the greater ability to detect and reject a defective lot), as indicated by a lower $P_a$. Therefore, comparative values of $P_a$ were computed by assigning values to each of the three factors ("IR," "n" and "c") described above.

First, the incident rates (IR) of *E. coli* O157:H7 at each of the two respective sampling points (fresh beef trim in combo-bins just prior to shipping, and split carcasses just prior to chilling) were estimated based on available data (literature citations). Second, the "n" values from each of the two respective lot acceptance sampling plans were used. Finally, for the case of zero tolerance, "c" was set to zero (c=0).

Operating Characteristics Evaluation. Again, following conventions set forth by the ICMSF (Id), comparative values of $P_a$ were computed using an operating characteristic function, and depicted as an operating characteristic (OC) curve. OC curves were generated using Sampling Plan Analyzer (Version 2) from Taylor Enterprises, Inc (Libertyville, Ill.). The function used was to evaluate the two sampling plans for single defects from a pool of representative stratified samples, where a stratified sample is one where it is specified that equal number of test samples should come from different parts of the lots.

Incident Rates of *Escherichia coli* O157:H7 at Various Beef Slaughter Process Points Estimates from the literature. The incident rate of *Escherichia coli* O157:H7 on steer and heifer carcasses after chilling was tested as part of the United States Department of Agriculture nationwide beef microbiological baseline data collection program (FSIS, United States Department of Agriculture, 1996; "Nationwide Beef Microbiological Baseline Data Collection Program: Cows and Bulls; December 1993-November 1994"). A 0.2% incident rate was found on 2,081 carcasses. Additional data was collected on cow and bull carcasses, and a 0.0% incident rate was found on 2,112 carcasses (FSIS, United States Department of Agriculture, 1994; "Nationwide Beef Microbiological Baseline Data Collection Program: Steers and Heifers; October 1992-September 1993").

Since the time that this FSIS data was collected, the methods of detection and analysis for *E. coli* O157:H7 have improved, allowing lower detection limits. A recent paper by Elder et al (PNAS, 97:7, p 2999-3003, 2000) using more sensitive techniques found a 2% positive incident rate (6 out 341 carcasses) at post-processing after the carcasses had entered the cooler. This prevalence is substantially greater than that found in the FSIS study (0.2%) and indicates that the more sensitive method employed by Elder et. al was more efficient in detecting contaminated carcasses.

Figure 1B:
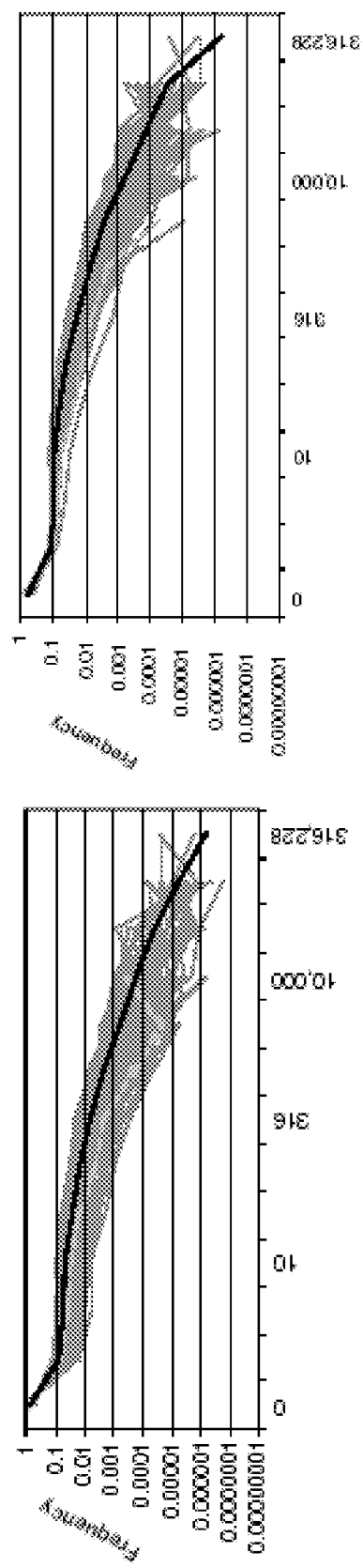

Recently, the USDA has intensified its efforts to reduce the risk of *Escherichia coli* O157:H7. In support of this effort, the USDA is in the process of preparing a risk assessment document (FSIS, by *Escherichia coli* O157:H7 Risk Assessment Team, 2001; "Draft Risk Assessment of the Public Health Impact of *Escherichia coli* O157:H7 in Ground Beef."). FIGS. 1A and 1B, herein, reproduce figures from this draft risk assessment document which show frequencies of various levels of *E. coli* O157:H7 in Combo-bins estimated from running 100 simulations of the USDA risk assessment model.

FIG. 1A (left and right panels) show a comparison of seasonal distributions for number of *E. coli* O157:H7 in combo bins constructed from the slaughter of breeding (cow/bull) cattle. Dark lines are the mean distributions for each season. FIG. 1A (left panel) shows a plot of the frequency of occurrence (y-axis) vs the number of *E. coli* O157:H7 (x-axis) in Combo-bins made from cow/bull carcasses in a low prevalence season. The right panel of FIG. 1A shows a plot of the frequency of occurrence (y-axis) vs the number of *E. coli* O157:H7 (x-axis) in Combo-bins made from cow/bull carcasses in a high prevalence season.

FIG. 1B (left and right panels) show a comparison of seasonal distributions for number of *E. coli* O157:H7 in combo bins constructed from the slaughter of feedlot (steer/heifer) cattle. Dark lines are the mean distributions for each season. FIG. 1B (left panel) shows a plot of the frequency of occurrence (y-axis) vs. the number of *E. coli* O157:H7 (x-axis) in Combo-bins made from steer/heifer carcasses in a low prevalence season. The right panel of FIG. 1B shows a plot of the frequency of occurrence (y-axis) vs. the number of *E. coli* O157:H7 (x-axis) in Combo-bins made from steer/heifer carcasses in a high prevalence season.

The minimum detection limit for *E. coli* O157:H7 is one organism in 75 g of meat. In the 10,000 lbs of meat that are contained in five combo bins, there are 60,606 sample units. Thus, 60,606 organisms perfectly and homogeneously distributed throughout the beef trim would be required to ensure that there was a 100% probability of detecting *E. coli* O157:H7 in every sample drawn. Obviously, this will not happen. However, it is instructive to examine what the predicted frequencies are for encountering 10,000 organisms in 10,000 lbs, which would generate an average concentration considerably less than the minimum detection limit. Under all conditions including season (high vs. low prevalence) and beef source (cow/bull vs. steer/heifer) the frequency for observing 10,000 organisms in 10,000 lbs is predicted to be less than 0.001, or 1 in 1,000.

This indicates, according to the present invention, that the actual incident rate of detectable *E. coli* O157:H7 is considerably lower in beef trim (ca. 0.001) than it is in carcasses (2%). As will be detailed below, the higher incident rate is much easier to detect, and therefore the probability of accepting a defective lot much lower.

Surface vs. Deep Muscle

A key premise in the above-described USDA draft risk assessment document is that all of the E. coli O157:H7 is assumed to be on the surface of the carcass. When carcasses pass through fabrication, then the carcass surface is essentially 'diluted' by the exposure of new surfaces representing deep muscle tissue.

Therefore, according to the present invention, when samples are drawn from beef trim according to the prior art lot acceptance sampling plan, the chances of detecting E. coli O157:H7 contamination are reduced. By contrast, the instant inventive lot acceptance methods comprise sampling that is directed at the surface, and specifically at those surfaces (sample locations) where contamination is most likely found.

EXAMPLE II

Statistical Comparison of Prior Art and Inventive Lot Acceptance Sampling Methods/Plans Comparison on the Basis of Operating Characteristic ("OC") Curves The prior art and instant inventive lot acceptance sampling plans were compared using operating characteristic function as described above under EXAMPLE I herein. The approach, as described above, was to compute and compare the probability of acceptance ($P_a$) for a defective lot for the prior art and instant inventive lot acceptance sampling plans. The results are shown in TABLE 1, and FIGS. 2 through 4, below.

TABLE 1 shows the probability of acceptance ("$P_a$") for various incident rates ("IR") as a function of sampling number, "n". The comparative values of $P_a$, were computed by assigning values to each of the three factors ("IR," "n" and "c") as described herein above, under EXAMPLE I.

Figure 2:
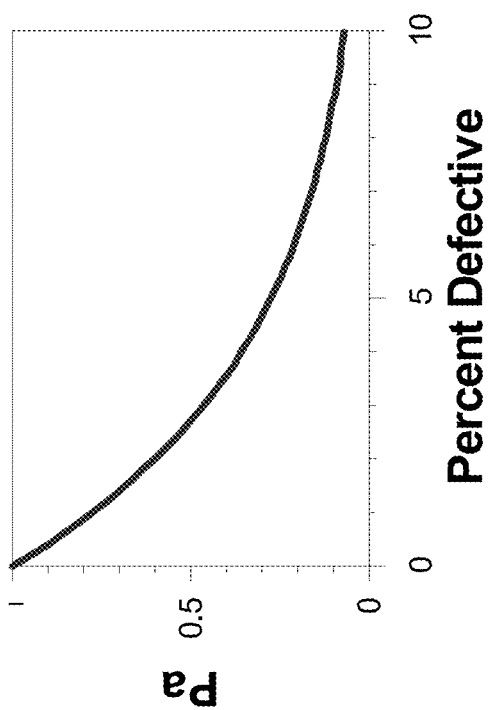
FIG. 2 shows an Operating Characteristics (OC) curve for a typical prior art lot acceptance sampling plan, where "n"=25.

FIG. 2 shows an Operating Characteristics curve for a typical prior art lot acceptance sampling plan, where "n"=25. The probability of acceptance ("$P_a$") is shown along the y-axis, and "percent defective" along the x-axis, for a sampling number "n" of 25, and a "c" value of zero.

Figure 3:
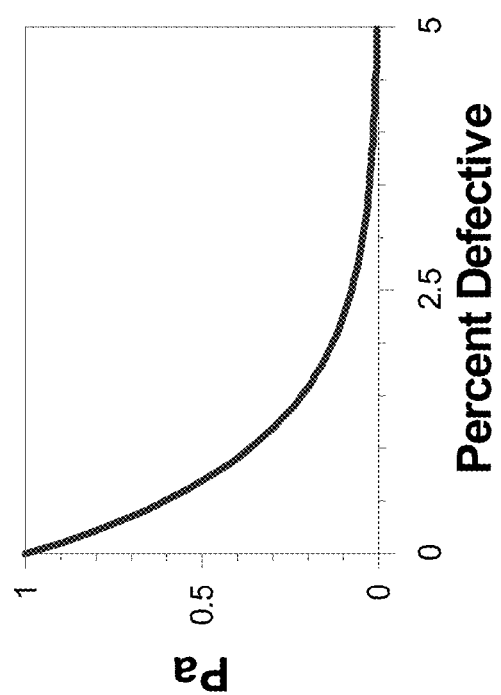
FIG. 3 shows Operating Characteristics (OC) curve for a representative embodiment of the instant inventive lot acceptance sampling plan, where "n"=100.

FIG. 3 shows Operating Characteristics curve for a representative embodiment of the instant inventive lot acceptance sampling plan, where "n"=100. The probability of acceptance ("$P_a$") is shown along the y-axis, and "percent defective" along the x-axis, for a sampling number "n" of 100, and a "c" value of zero.

Figure 4:
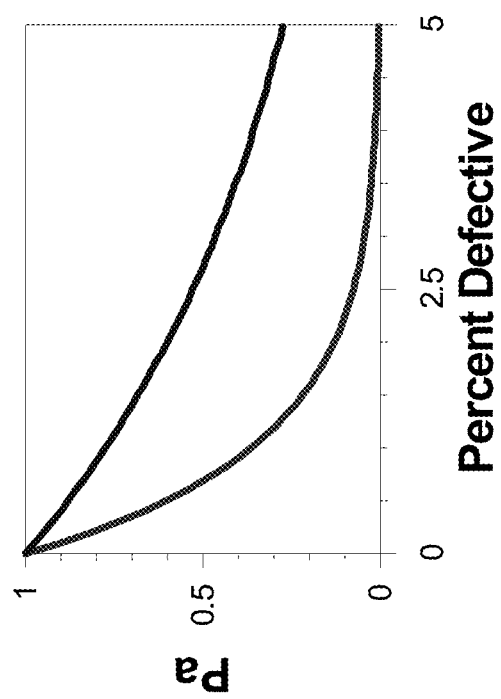
FIG. 4 shows a combined graph of the Operating Characteristics (OC) curve for both prior art and a representative embodiment of the instant inventive lot acceptance sampling plan, where "n"=25, or "n"=100, respectively. The probability of acceptance ("$P_a$") is shown along the y-axis, and "percent defective" along the x-axis, for a "c" value of zero.

FIG. 4 shows a combined graph of the Operating Characteristics curve for both prior art (upper curve) and a representative embodiment of the instant inventive lot acceptance sampling plan (lower curve), where "n"=25, or "n"=100, respectively. The probability of acceptance ("$P_a$") is shown along the y-axis, and "percent defective" along the x-axis, for a "c" value of zero.

With the Prior art sampling plan there is 99% to 97.5% chance of accepting a contaminated lot of trim (with 0.1% prevalence rate, and 5-25 pieces of meat tested per/lot), whereas using a representative embodiment of the instant inventive sampling plan (prevalence rate of 2%, with 100 samples taken and composited per lot), there is only 13.3% chance of accepting a contaminated lot.

Moreover the relative odds further improve in favor of the instant inventive methods as the prevalence rate increases during the summer season. For example, according to the present invention, a prevalence rate of 3%, will result in 4.8% chance of accepting a defective lot, or more than 95% chance of rejecting a contaminated lot.

Therefore, compared with typical prior art methods, the inventive lot acceptance sampling methods/plans provide a greater power of discrimination (i.e., the greater ability to detect and reject a defective lot) as indicated by a lower $P_a$. A portion of this discrimination is derived from the fact that the "n" value for the representative inventive lot acceptance sampling plan is three-times larger (75) than that for the typical prior art plan (25).

TABLE 1

Probability of acceptance for various incident rates as a function of sampling number, "n".

| | Probability of Acceptance ($P_a$) for various n values | | | | | |
|---|---|---|---|---|---|---|
| Incident Rate | $P_a$ for n = 5 | $P_a$ for n = 10 | $P_a$ for n = 15 | $P_a$ for n = 20 | $P_a$ for n = 25 | $P_a$ for n = 100 |
| 0.0 | 1 | 1 | 1 | 1 | 1 | 1 |
| 0.1 | 0.995 | 0.990 | 0.985 | 0.980 | 0.975 | 0.905 |
| 0.2 | 0.990 | 0.980 | 0.970 | 0.961 | 0.951 | 0.819 |
| 0.3 | 0.985 | 0.970 | 0.956 | 0.942 | 0.928 | 0.740 |
| 0.4 | 0.980 | 0.961 | 0.942 | 0.923 | 0.905 | 0.670 |
| 0.5 | 0.975 | 0.951 | 0.928 | 0.905 | 0.882 | 0.606 |
| 0.6 | 0.970 | 0.942 | 0.914 | 0.887 | 0.860 | 0.548 |
| 0.7 | 0.965 | 0.932 | 0.900 | 0.869 | 0.839 | 0.495 |
| 0.8 | 0.961 | 0.923 | 0.886 | 0.852 | 0.818 | 0.448 |
| 0.9 | 0.956 | 0.914 | 0.873 | 0.835 | 0.798 | 0.405 |
| 1.0 | 0.951 | 0.904 | 0.860 | 0.818 | 0.779 | 0.366 |
| 1.2 | 0.941 | 0.886 | 0.834 | 0.785 | 0.739 | 0.299 |
| 1.4 | 0.932 | 0.868 | 0.809 | 0.754 | 0.703 | 0.244 |
| 1.6 | 0.923 | 0.851 | 0.785 | 0.724 | 0.668 | 0.199 |
| 1.8 | 0.913 | 0.834 | 0.762 | 0.695 | 0.635 | 0.163 |
| 2.0 | 0.904 | 0.817 | 0.739 | 0.668 | 0.603 | 0.133 |
| 2.5 | 0.881 | 0.776 | 0.684 | 0.603 | 0.531 | 0.080 |
| 3.0 | 0.859 | 0.737 | 0.633 | 0.544 | 0.467 | 0.048 |
| 3.5 | 0.837 | 0.700 | 0.586 | 0.490 | 0.410 | 0.028 |
| 4.0 | 0.815 | 0.665 | 0.542 | 0.442 | 0.360 | 0.017 |
| 4.5 | 0.794 | 0.631 | 0.501 | 0.398 | 0.316 | 0.010 |
| 5.0 | 0.774 | 0.599 | 0.463 | 0.358 | 0.277 | 0.006 |

The other significant factor, according to the present invention, is optimally selecting one or more sampling points (test locations) that have a high chance of having detectable levels of E. coli O157 contamination. According to the present invention, the test location for obtaining the test sample is selected in a random or rotational order from the group consisting of rump, brisket and flank, and combinations thereof. This also allows, if desired, for systematic comparisons with additional monitoring of microbial interventions along process line (see Elder et al., PNAS 97:2999-3003, 2000; Correlation of enterohemorrhagic Escherichia coli O157 prevalence in feces, hides, and carcasses of beef cattle during processing).

EXAMPLE III

Reconditioning of Contaminated Carcasses

In particular embodiments, the present invention provides methods for identifying defective lots of carcasses; defined as a lot that has tested positive for the presence of E. coli O157:H7 or other pathogens of interest. The carcass lots are sampled as they enter the storage coolers for chilling, and they are held there for about 24 hours, as a normal part of the production process. In preferred embodiments, composite samples, each representing a chilled lot, are immediately processed by enrichment PCR, enrichment immunodetection, or by other appropriate methods (see herein above). Given that most preferred methods yield results in 10-14 hours, by the time the defective lots are identified, there is still enough time to separate them and start the reconditioning (remedial) aspect of the present invention.

According to preferred remedial aspects of the present invention, each defective lot is divided into 2-4 sub-lots of approximately 25 carcasses each. The carcasses are then subjected to a regimen of treatment processes that aim to remove/inactivate/kill the pathogens that reside on the surface of the carcasses. The regiment can include any number of treatments, including but not limited to application of hot or cold organic acid (e.g., lactic acid) or alkaline washes, hot water-, or steam-pasteurization, washing with food grade sanitizers, various forms of ionizing and non-ionizing radiation, etc. Preferably, the carcasses are subjected to a plurality of remedial interventions. Preferably, the protocols insure that hard-to-reach surfaces will receive the treatments.

Following reconditioning, each sub-lot is sampled individually by taking 1-4 remedial samples from each remedial half-carcass portion. Remedial samples are analyzed for the presence of the same pathogen, using any one or more of the aforementioned methods. A sub-lot that has tested negative becomes releasable into the production process/stream, whereas ones testing positive (i.e., that fail) are subjected to additional remedial re-conditioning and sampling.

The invention claimed is:

1. A method for detecting a contaminated carcass and preventing its movement into or across a production area, comprising:
   splitting carcasses of a carcass-Lot to provide a split-carcass-Lot, wherein each split-portion is identifiable with, or otherwise attributable to the carcass- or split-carcass-Lot;
   obtaining a test sample from at least one test location of at least one split-portion of each carcass, wherein the test samples are obtained prior to or during chilling of the respective split portions, to produce a sampled and chilled split-carcass-Lot;
   combining the test samples to provide a composite-Lot test sample; and
   determining, by assaying the composite-Lot test sample or a portion thereof with an assay suitable to detect a particular pathogenic or microbial contamination, whether or not the composite-Lot test sample is contaminated thereby, whereby entry of the chilled split-carcass-Lot into the production area is precluded if the corresponding composite-Lot test sample is contaminated, or certified if not contaminated.

2. The method of claim 1, wherein the test location for obtaining the test sample is selected in a random or repeated order from the group consisting of rump, brisket, back and flank, and combinations thereof.

3. The method of claim 1, wherein obtaining a test sample comprises obtaining a plurality of test samples, in each case from a distinct test location.

4. The method of claim 1, wherein the carcass-Lot size is at least 50 carcasses, wherein obtaining comprises obtaining at least one test sample from each respective split portion, and wherein the test location is selected in a random or repeated order from the group consisting of rump, brisket, back and flank, and combinations thereof.

5. The method of claim 1 wherein the carcass Lot size is at least 100 carcasses, wherein obtaining comprises obtaining at least one test sample per carcass from one of the respective split portions, and wherein the test location is selected in a random or repeated order from the group consisting of rump, brisket, back and flank, and combinations thereof.

6. The method of claim 1, wherein the assay suitable for detection of the particular pathogenic or microbial contamination is selected from the assay group consisting of immunoassays, nucleic acid amplification-based assays, PCR-based assays, nucleic acid hybridization-based assays, biosensor assays, immunostaining-microscopy-based assays, nucleic acid-array-based assays, DNA chip-based assays, bacteriophage-detection-based assays, and chemical or biochemical assays based on the detection of compounds associated with particular target organisms or groups of target organisms, and combinations thereof.

7. The method of claim 1, wherein the test sample is an extracted surface sample, or an excised tissue section, corresponding to, or having, respectively, a surface area of at least 4, at least 6, at least 8, at least 10, at least 12, or at least 16 square inches.

8. The method of claim 1, wherein the test sample is an extracted surface sample, or an excised tissue section, corresponding to, or having, respectively, a surface area of about 16 square inches.

9. The method of claim 1, wherein the particular microbe or pathogen is selected from the group consisting of *Escherichia coli* O157:H7 (*E. coli* O157:H7), enterohemorrhagic *Escherichia coli* (EHEC), enterotoxigenic *Escherichia coli* (ETEC), enteroinvasive *Escherichia coli* (EIEC), enteropathogenic *Escherichia coli* (EPEC), *Salmonella, Listeria, Yersinia, Campylobacter, Clostridial species, Staphylococcus spp.*; frank and opportunistic bacterial, fungal, viral, parasitic pathogens; indicator organisms including heterotrophes, generic *E. coli*, fecal coliforms and *enterococcus*; spoilage organisms including *Pseudomonas*; transmissable spongiform encephalopathy (TSE) agents (prions), including bovine spongiform encephalopathy (BSE) agents, scrapie, chronic wasting disease agents; and combinations thereof.

10. The method of claim 9, wherein the particular microbe or pathogen is *Escherichia coli* O157:H7 (*E. coli* O57:H7).

11. The method of claim 1, wherein the carcass is selected from the group consisting of cattle, sheep, pigs, bison, elk, deer, chicken, turkey, fish and combinations thereof.

12. The method of claim 1, further comprising, in an instance of contamination:
   reconditioning the corresponding contaminated split-carcass-Lot to provide a remedial-Lot or a plurality of distinguishable fractional-remedial-Lots;
   obtaining, for the remedial-Lot or for each fractional-remedial-Lot, at least one remedial test sample from at least one location of at least one split-portion of each remedial-carcass, wherein the remedial test samples are obtained prior to or during chilling of the respective reconditioned split-portions, to produce a corresponding sampled and chilled remedial-split-Lot, or a plurality of corresponding sampled and chilled fractional-remedial-Lots;
   combining, for the remedial-Lot or for each fractional-remedial-Lot, the remedial test samples to provide a corresponding composite-remedial-Lot test sample or a plurality of corresponding composite-fractional-remedial-Lot test samples; and
   determining, for the remedial-Lot or for each fractional-remedial-Lot, by assaying the corresponding composite-remedial-Lot test sample or corresponding composite-fractional-remedial test sample, or portions thereof, with an assay suitable to detect the particular microbial or pathogenic contamination, whether or not the composite-remedial-Lot test sample is contaminated thereby, whereby entry of the respective chilled remedial-split-carcass-Lot into the production area is allowed if the corresponding composite-remedial-Lot test sample is not contaminated, or is not allowed if contaminated.

13. The method of claim 12, wherein reconditioning comprises pasteurizing or otherwise sanitizing the corresponding contaminated split-carcass-Lot, wherein there is a plurality of distinguishable fractional-remedial-Lots, wherein obtaining comprises obtaining at least three remedial test samples, each from a distinct location, from each respective remedial-split-portion, and wherein the remedial test location is selected in a random or repeated order from the group consisting of rump, brisket, back, flank and combinations thereof.

14. The method of claim 13, wherein reconditioning comprises pasteurizing or otherwise sanitizing the corresponding contaminated split-carcass Lot, and wherein there are at least four distinguishable fractional-remedial-Lots.

15. The method of claim 12, wherein reconditioning comprises pasteurizing or otherwise sanitizing the corresponding contaminated split-carcass-Lot, wherein there is a plurality of distinguishable fractional-remedial-Lots, wherein obtaining comprises obtaining at least three remedial test samples, each from a distinct location, from one of the respective remedial split portions, and wherein the remedial test location is selected in a random or repeated order from the group consisting of rump, brisket, back, flank and combinations thereof.

16. The method of claim 15, wherein reconditioning comprises pasteurizing or otherwise sanitizing the corresponding contaminated split-carcass Lot, and wherein there are at least four distinguishable fractional-remedial-Lots.

17. The method of claim 12, wherein the test location for obtaining the remedial test sample is selected in a random or rotational order from the group consisting of rump, brisket, back, flank, and combinations thereof.

18. The method of claim 12, wherein obtaining a remedial test sample comprises obtaining a plurality of test samples, in each case from a distinct test location.

19. The method of claim 12, wherein the assay suitable for detection of the particular pathogenic or microbial contamination is selected from the assay group consisting of immunoassays, nucleic acid amplification-based assays, PCR-based assays, nucleic acid hybridization-based assays, biosensor assays, immunostaining-microscopy-based assays, nucleic acid-array-based assays, DNA chip-based assays, bacteriophage-detection-based assays, and chemical or biochemical assays based on the detection of compounds associated with particular target organisms or groups of target organisms, and combinations thereof.

20. The method of claim 12, wherein the remedial test sample is an extracted surface sample, or an excised tissue section, corresponding to, or having, respectively, a surface area of at least 4, at least 6, at least 8, at least 10, at least 12, or at least 16 square inches.

21. The method of claim 12, wherein the test sample is an extracted surface sample, or an excised tissue section, corresponding to, or having, respectively, a surface area of about 16 square inches.

22. A method for detecting a contaminated carcass and preventing its movement into or across a production area, comprising:
    splitting carcasses of a carcass-Lot to provide a split-carcass-Lot or a plurality of distinguishable fractional-split-carcass-Lots, wherein each split-portion is identifiable with, or otherwise attributable to the split-carcass-Lot or to a respective fractional-split-carcass-Lot;
    obtaining, for the split-carcass-Lot or for each fractional-split-carcass-Lot, a test sample from at least one test location of at least one split-portion of each carcass, wherein the test samples are obtained prior to or during chilling of the respective split portions, to produce a sampled and chilled split-carcass-Lot, or a plurality of corresponding sampled and chilled fractional-split-carcass-Lots;
    combining, for the split-carcass-Lot or for each fractional-split-carcass-Lot, the test samples to provide a corresponding composite-split-carcass-Lot test sample or a plurality of corresponding composite-fractional-split-portion-Lot test samples; and
    determining, for the split-portion-Lot or for each fractional-split-portion-Lots, by assaying the composite-Lot test sample or a portion thereof with an assay suitable to detect a particular pathogenic or microbial contamination, whether or not the composite-Lot test sample is contaminated thereby, whereby entry of the chilled split-carcass-Lot, or entry of a particular fractional-split-carcass-Lot into the production area is precluded if the corresponding composite-Lot test sample is contaminated, or certified if not contaminated.

23. The method of claim 1, wherein the method is practiced in the context of an implemented, art-recognized hazard analysis critical control point (HACCP) plan.

24. A method for certifying a carcass, comprising:
    splitting carcasses of a carcass-Lot to provide a split-carcass-Lot, wherein each split-portion is identifiable with, or otherwise attributable to the split-carcass-Lot;
    obtaining a test sample from at least one test location of at least one split-portion of each carcass, wherein the test samples are obtained prior to or during chilling of the respective split portions, to produce a sampled and chilled split-carcass-Lot;
    combining the test samples to provide a composite-Lot test sample; and
    determining, by assaying the composite-Lot test sample or a portion thereof with an assay suitable to detect a particular pathogenic or microbial contamination, whether or not the composite-Lot test sample is contaminated thereby, whereby each carcass of the chilled split-carcass-Lot is certified if the corresponding composite-Lot test sample is not contaminated.

25. The method of claim 24, wherein the test location for obtaining the test sample is selected in a random or repeated order from the group consisting of rump, brisket, back and flank, and combinations thereof.

26. The method of claim 24, wherein obtaining a test sample comprises obtaining a plurality of test samples, in each case from a distinct test location.

27. The method of claim 24, wherein the carcass-Lot size is at least 50 carcasses, wherein obtaining comprises obtaining at least one test sample from each respective split portion, and wherein the test location is selected in a random or repeated order from the group consisting of rump, brisket, back and flank, and combinations thereof.

28. The method of claim 24 wherein the carcass Lot size is at least 100 carcasses, wherein obtaining comprises obtaining at least one test sample per carcass from one of the respective split portions, and wherein the test location is selected in a random or repeated order from the group consisting of rump, brisket, back and flank, and combinations thereof.

29. The method of claim 24, wherein the assay suitable for detection of the particular pathogenic or microbial contamination is selected from the assay group consisting of immunoassays, nucleic acid amplification-based assays, PCR-based assays, nucleic acid hybridization-based assays, biosensor assays, immunostaining-microscopy-based assays, nucleic acid-array-based assays, DNA chip-based assays, bacteriophage-detection-based assays, and chemical or biochemical assays based on the detection of compounds associated with particular target organisms or groups of target organisms, and combinations thereof.

30. The method of claim 24, wherein the test sample is an extracted surface sample, or an excised tissue section, corresponding to, or having, respectively, a surface area of at least 4, at least 6, at least 8, at least 10, at least 12, or at least 16 square inches.

31. The method of claim 24, wherein the test sample is an extracted surface sample, or an excised tissue section, corresponding to, or having, respectively, a surface area of about 16 square inches.

32. The method of claim 24, wherein the particular microbe or pathogen is selected from the group consisting of *Escherichia coli* O157:H7 (*E. coli* O157:H7), enterohemorrhagic *Escherichia coli* (EHEC), enterotoxigenic *Escherichia coli* (ETEC), enteroinvasive *Escherichia coli* (EIEC), enterpathogenic *Escherichia coli* (EPEC), *Salmonella, Listeria, Yersinia, Campylobacter, Clostridial species, Staphylococcus spp.*; frank and opportunistic bacterial, fungal, viral, parasitic pathogens; indicator organisms including heterotrophes, generic *E. coli*, fecal coliforms and *enterococcus*; spoilage organisms including *Pseudomonas*; transmissable spongiform encephalopathy (TSE) agents (prions), including bovine spongiform encephalopathy (BSE) agents, scrapie, chronic wasting disease agents; and combinations thereof.

33. The method of claim 32, wherein the particular microbe or pathogen is *Escherichia coli* O157:H7 (*E. coli* O157:H7).

34. The method of claim 24, wherein the carcass is selected from the group consisting of cattle, sheep, pigs, bison, elk, deer, chicken, turkey, fish and combinations thereof.

\* \* \* \* \*